Patented May 16, 1933

1,909,241

UNITED STATES PATENT OFFICE

FERNANDO SOMOZA VIVAS, OF BRONXVILLE, NEW YORK, ASSIGNOR TO INTERNATIONAL FIREPROOF PRODUCTS CORPORATION, OF NEW YORK, N. Y., A CORPORATION OF DELAWARE

NONLEACHING FIREPROOF WOOD AND METHOD OF PRODUCING THE SAME

No Drawing.     Application filed November 18, 1929. Serial No. 408,172.

The invention relates to the waterproofing and fireproofing of material and has as an object the provision of a thoroughly fireproof wood which will be waterproof in the sense that application of moisture to the wood will not affect its fireproof qualities.

It is a further object of the invention to provide a wood which will suffer no deterioration from the action of the chemicals, which is immune to attacks of insects and rot fungi, and which will remain permanently fireproof under normal conditions.

It is a further object of the invention to provide a process for producing a fireproof wood which will be non-hygroscopic.

It is a further object of the invention to provide a wood fireproofed by the presence of magnesium silicate, magnesium carbonate, with a small proportion of ricinoleate and linoleate.

Further objects of the invention will appear from the following description of an illustrative embodiment of the invention in its preferred form.

In accordance with the invention a solution is first prepared as follows: 75 pounds of castor oil and 25 pounds of linseed oil are mixed with a solution of 17 pounds of potassium hydrate and 100 pounds of water, which mixture is heated preferably in a steam jacketed kettle and stirred. After the chemical reaction is complete, there is added to the solution 10 pounds of sodium carbonate dissolved in 25 pounds of sodium silicate.

To prepare solution No. 1 for use, 20 gallons of water are added to sufficient of the material prepared as above to produce a solution of 10 degrees Bé at 60° F. temperature and to this quantity of solution are added 80 gallons of sodium silicate at 22 degrees Bé at 60° F.

A second solution is prepared in the proportions of ammonium sulphate 1 pound, 4 ounces, borax 12 ounces, magnesium sulphate 12 ounces dissolved in water to make one gallon.

The wood is first treated with the first solution prepared as above preferably by introducing the solution into a container in which the wood is held under vacuum, and pressure is desirably applied to the solution having the material immersed therein.

When the wood has been thoroughly impregnated with the first solution, the solution is withdrawn and the second solution is then introduced. It is preferred to dry the wood at least to a surface dry condition prior to the application of the second solution. After thorough impregnation by the second solution, the solution is withdrawn and the wood is dried and is then ready for use.

By the treatment described the wood has deposited in its pores magnesium silicate and magnesium carbonate which are insoluble, or substantially insoluble, in water, and which are non-inflammable at a very high temperature, together with a small portion of a ricinoleate and a linoleate, which are also non-inflammable, and the wood will be found to be fireproof and nonhygroscopic.

While it is preferred to treat the material with the named solutions in the order above described, yet satisfactory results can be secured by the reversal of the order of application of the solutions.

Minor changes may be made in the steps of the process and chemical equivalents for the named ingredients may be utilized without departing from the spirit of the invention within the scope of the appended claims.

I claim:

1. The method of fireproofing wood or the like which comprises, treating a mixture of castor oil and linseed oil with potassium hydrate and adding sodium carbonate and sodium silicate to produce a solution, preparing a solution of ammonium and magnesium sulphates and borax, and immersing the material successively in said solutions.

2. The method of fireproofing wood or the like which comprises, treating a mixture of castor oil and linseed oil with potassium hydrate and adding sodium carbonate and sodium silicate to produce a solution, preparing a solution of ammonium and magnesium sulphates and borax, and immersing the material successively in said solutions with reduction of moisture content of the material between immersions.

3. The method of fireproofing wood or the like which comprises, treating a mixture of a major portion of castor oil and a minor portion of linseed oil with a solution of potassium hydrate and adding sodium carbonate dissolved in sodium silicate, adding a minor portion of the thus prepared material to a major portion of sodium silicate to prepare a solution for use, preparing a solution of ammonium and magnesium sulphates and borax, and immersing the material to be treated in said solutions successively.

4. The method of fireproofing wood or the like which comprises, immersing the material successively in a solution of a mixture of potassium ricinoleate, potassium linoleate and sodium carbonate in sodium silicate and in a solution of ammonium and magnesium sulphates and borax.

5. The method of fireproofing wood or the like which comprises, heating and mixing together substantially 75 pounds of castor oil, substantially 25 pounds of linseed oil and substantially 18 pounds of potassium hydrate dissolved in 100 pounds of water, adding to the resulting material substantially 10 pounds of sodium carbonate dissolved in 25 pounds of sodium silicate, diluting the solution to substantially 10 degrees Bé and combining substantially 20 gallons thereof with substantially 80 gallons of sodium silicate of a consistency of substantially 22 degrees Bé to prepare a solution for use, immersing the material successively in the thus prepared solution and in a solution of substantially 1 pound 4 ounces of ammonium and 12 ounces each of magnesium sulphate and of borax with reduction of moisture content of the material between treatments.

FERNANDO SOMOZA VIVAS.